US012798576B2

(12) United States Patent
Hwang

(10) Patent No.: US 12,798,576 B2
(45) Date of Patent: Nov. 17, 2026

(54) ELECTRIFIED VEHICLE AND METHOD OF CONTROLLING DRIVING THEREOF

(71) Applicants: HYUNDAI MOTOR COMPANY, Seoul (KR); KIA CORPORATION, Seoul (KR)

(72) Inventor: Jin Young Hwang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 274 days.

(21) Appl. No.: 18/535,348

(22) Filed: Dec. 11, 2023

(65) Prior Publication Data

US 2025/0091576 A1 Mar. 20, 2025

(30) Foreign Application Priority Data

Sep. 18, 2023 (KR) ........................ 10-2023-0124131

(51) Int. Cl.

*B60W 10/192* (2012.01)
*B60W 20/12* (2016.01)
*B60W 30/14* (2006.01)
*B60W 30/18* (2012.01)

(52) U.S. Cl.

CPC .......... *B60W 30/146* (2013.01); *B60W 20/12* (2016.01); *B60W 30/18127* (2013.01)

(58) Field of Classification Search

CPC ............... B60W 30/146; B60W 20/12; B60W 30/18127; B60W 20/00; B60W 2520/10; B60W 2552/15; B60W 2710/083; B60W 10/08; B60W 30/18072; B60W 30/14; B60W 60/00; B60L 2220/42; B60L 2240/12; B60L 2260/28; B60L 3/12; B60L 7/18; B60L 15/2045; B60Y 2200/91; Y02T 10/7072; Y02T 10/72

See application file for complete search history.

(56) References Cited

U.S. PATENT DOCUMENTS

| | | | | |
|---|---|---|---|---|
| 6,033,041 | A * | 3/2000 | Koga | B60L 7/18 303/192 |
| 9,630,624 | B2 * | 4/2017 | Raghu | B60W 30/143 |
| 9,796,385 | B2 * | 10/2017 | Krueger | B60W 10/196 |
| 9,884,554 | B2 * | 2/2018 | Kemnitz | B60W 50/085 |
| 2018/0134296 | A1 * | 5/2018 | Oh | B60W 10/08 |

FOREIGN PATENT DOCUMENTS

| | | | | |
|---|---|---|---|---|
| CN | 106627166 B | * | 5/2019 | B60L 7/10 |

* cited by examiner

*Primary Examiner* — Masud Ahmed

(74) *Attorney, Agent, or Firm* — Lempia Summerfield Katz LLC

(57) ABSTRACT

An electrified vehicle includes a first motor corresponding to a first drive wheel, a second motor corresponding to a second drive wheel, and a controller. The controller determines a target control vehicle speed based on a preset target vehicle speed when a vehicle including the first motor and the second motor enters a travel control mode in which acceleration travel and deceleration travel after the acceleration travel are repeatedly performed. The controller also performs regenerative braking or coasting control on each of the first motor and the second motor when the vehicle performs the deceleration travel in consideration of the determined target control vehicle speed and integrated fuel efficiencies when the vehicle performs the acceleration travel and the deceleration travel, and a method of controlling the travel thereof.

16 Claims, 7 Drawing Sheets

FIG. 6

| case | first motor | second motor | upon acceleration travel | | upon deceleration travel | | integrated fuel efficiency |
|---|---|---|---|---|---|---|---|
| | | | power consumption | travel distance | power consumption (= charge amount) | travel distance | |
| 1 | coasting | coasting | 0.432Wh | 100m | 0Wh | 100m | 462.96 km/kWh |
| 2 | coasting | regenerative braking | 0.432Wh | 100m | −0.07Wh | 60m | 376.47 km/kWh |
| 3 | regenerative braking | coasting | 0.432Wh | 100m | −0.05Wh | 70m | 398.13 km/kWh |
| 4 | regenerative braking | regenerative braking | 0.432Wh | 100m | −0.1Wh | 50m | 451.81 km/kWh |

ELECTRIFIED VEHICLE AND METHOD OF CONTROLLING DRIVING THEREOF

CROSS REFERENCE TO RELATED APPLICATION

The present application claims priority to Korean Patent Application No. 10-2023-0124131, filed Sep. 18, 2023, the entire contents of which are incorporated herein for all purposes by this reference.

TECHNICAL FIELD

The present disclosure relates to an electrified vehicle and a method of controlling the travel of the electrified vehicle, which controls the electrified vehicle to travel with optimal fuel efficiency when the electrified vehicle travels.

BACKGROUND

Recently, as interest in the environment has increased, the number of electrified vehicles equipped with an electric motor (or a driving motor) as a drive source is growing. Examples of electrified vehicles include electric vehicles (EVs), hybrid electric vehicles (HEVs), and fuel cell vehicles (FCEVs).

In particular, the electrified vehicles are driven in consideration of fuel efficiency. Research for increasing fuel efficiency has recently been actively conducted. Furthermore, research has also been conducted for increasing fuel efficiency for vehicles equipped with an autonomous driving function or a smart cruise control function for reducing the burden on drivers of the vehicles.

Conventionally, for vehicles equipped with the autonomous driving function or the smart cruise control function, attempts have been made to increase fuel efficiency through constant speed driving when the corresponding function is performed. However, when performing the corresponding function, the vehicle travels at a constant, relatively low speed. Thus, there is a problem in that, since a driving motor operates at an inefficient operating point, optimal fuel efficiency may not be secured or achieved. Therefore, recently, when the autonomous driving function or the smart cruise control function is performed, an attempt has been made to achieve optimal fuel efficiency by allowing the vehicle to accelerate and then perform a pulse and glide (PnG) control mode instead of traveling at a constant speed.

When performing the PnG control mode, the vehicle may travel at an operating point at which the efficiency of the driving motor is high by allowing the vehicle to accelerate at a preset acceleration during acceleration. During PnG, a battery may be charged by the regenerative braking of the driving motor. When it is advantageous to perform PnG compared to the regenerative braking, it is possible to achieve a travel distance by performing no-load travel (e.g., coasting travel), thereby obtaining optimal fuel efficiency.

However, in the case of an electrified vehicle including a driving motor provided on each of front and rear wheels (e.g., all-wheel drive (AWD)), the driving motor of the optimized specification may be applied to each of the front and rear wheels. When an electrified vehicle to which the driving motor of a different specification is applied performs the PnG control mode, there is a problem in that optimal fuel efficiency may not be secured or attained by one method of performing the regenerative braking or the no-load travel during PnG.

The subject matter explained as the background art is for the purpose of enhancing understanding of the background of the present disclosure. Thus, the above should not be taken as acknowledging that the subject matter corresponds to the related art already known to those of ordinary skill in the art.

SUMMARY

The present disclosure has been proposed to solve the above problems. The present disclosure is directed to providing an electrified vehicle, which may travel while or attaining optimal fuel efficiency when the electrified vehicle travels with respect to the electrified vehicle including a motor provided on each of front and rear wheels. The present disclosure is also directed to a method of controlling the travel of such an electrified vehicle.

The objects of the present disclosure are not limited to the above-described object. Other objects that are not mentioned should be more clearly understood by those of ordinary skill in the art to which the present disclosure pertains from the following description.

A method of controlling travel of an electrified vehicle according to the present disclosure is provided for achieving the above objects. The method includes determining a target control vehicle speed based on a preset target vehicle speed when a vehicle including a first motor corresponding to a first drive wheel and a second motor corresponding to a second drive wheel enters a travel control mode in which acceleration travel and deceleration travel after the acceleration travel are repeatedly performed. The method also includes performing regenerative braking or coasting control on each of the first motor and the second motor when the vehicle performs the deceleration travel in consideration of the determined target control vehicle speed and integrated fuel efficiencies when the vehicle performs the acceleration travel and the deceleration travel.

For example, the method may further include, before the determining, entering the travel control mode when a smart cruise control function or autonomous driving function of the vehicle is activated.

For example, determining the target control vehicle speed may include determining the target control vehicle speed in consideration of a preset vehicle speed upper limit value and vehicle speed lower limit value additionally with respect to the target vehicle speed.

For example, the target control vehicle speed may include a target upper limit control vehicle speed considering the vehicle speed upper limit value with respect to the target vehicle speed and a target lower limit control vehicle speed considering the vehicle speed lower limit value with respect to the target vehicle speed.

For example, a section in which the acceleration travel is performed may be a section in which the vehicle accelerates from the target lower limit control vehicle speed to the target upper limit control vehicle speed. A section in which the deceleration travel is performed may be a section in which the vehicle decelerates from the target upper limit control vehicle speed to the target lower limit control vehicle speed.

For example, performing regenerative braking or coasting control may include determining integrated fuel efficiency of the vehicle in each of a plurality of cases in which each of the first motor and the second motor variously performs regenerative braking or coasting control. Performing regenerative braking or coasting control may also include performing the regenerative braking or coasting control on each of the first motor and the second motor to correspond to a case in which the integrated fuel efficiency is the highest in the plurality of cases.

For example, determining the integrated fuel efficiency may include determining the integrated fuel efficiency of the vehicle in consideration of an optimal regenerative efficiency operating point of the first motor or the second motor when at least one of the first motor and the second motor performs the regeneration braking among the plurality of cases.

For example, determining the integrated fuel efficiency may include determining the integrated fuel efficiency of the vehicle additionally in consideration of road information of a road on which the vehicle travels in each of the plurality of cases.

For example, after determining the target control vehicle speed, the method may further include; determining an acceleration of the vehicle in consideration of the determined target control vehicle speed and an optimal efficiency operating point of at least one of the first motor and the second motor when the vehicle performs the acceleration travel; and performing driving control on each of the first motor and the second motor based on the determined acceleration.

In addition, an electrified vehicle according to the present disclosure is provided for achieving the above objects. The electrified vehicle includes a first motor corresponding to a first drive wheel, a second motor corresponding to a second drive wheel, and a controller. The controller is configured to determine a target control vehicle speed based on a preset target vehicle speed when a vehicle including the first motor and the second motor enters a travel control mode in which acceleration travel and deceleration travel after the acceleration travel are repeatedly performed. The controller is also configured to perform regenerative braking or coasting control on each of the first motor and the second motor when the vehicle performs the deceleration travel in consideration of the determined target control vehicle speed and integrated fuel efficiencies when the vehicle performs the acceleration travel and the deceleration travel.

For example, the controller may determine that the vehicle has entered the travel control mode when a smart cruise control function or autonomous driving function of the vehicle is activated.

For example, the controller may determine the target control vehicle speed in consideration of a preset vehicle speed upper limit value and vehicle speed lower limit value additionally with respect to the target vehicle speed.

For example, the target control vehicle speed may include a target upper limit control vehicle speed considering the vehicle speed upper limit value with respect to the target vehicle speed and a target lower limit control vehicle speed considering the vehicle speed lower limit value with respect to the target vehicle speed.

For example, a section in which the acceleration travel is performed may be a section in which the vehicle accelerates from the target lower limit control vehicle speed to the target upper limit control vehicle speed. A section in which the deceleration travel is performed may be a section in which the vehicle decelerates from the target upper limit control vehicle speed to the target lower limit control vehicle speed.

For example, the controller may determine integrated fuel efficiency of the vehicle in each of a plurality of cases in which the regenerative braking or coasting control is variously performed on each of the first motor and the second motor. The controller may also perform the regenerative braking or coasting control on each of the first motor and the second motor to correspond to a case in which the integrated fuel efficiency is the highest among the plurality of cases.

For example, the controller may determine the integrated fuel efficiency of the vehicle in consideration of an optimal regenerative efficiency operating point of the first motor or the second motor when at least one of the first motor and the second motor performs the regeneration braking among the plurality of cases.

For example, the controller may determine the integrated fuel efficiency of the vehicle additionally in consideration of road information of a road on which the vehicle travels in each of the plurality of cases.

For example, the controller may determine an acceleration of the vehicle in consideration of the determined target control vehicle speed and an optimal efficiency operating point of at least one of the first motor and the second motor when the vehicle performs the acceleration travel. The controller may also perform driving control on each of the first motor and the second motor based on the determined acceleration.

According to the above description, in the electrified vehicle and the method of controlling travel of the electrified vehicle, by performing the optimal control on the motor provided on each of the front and rear wheels when the vehicle performs the travel control in which acceleration travel and deceleration travel after the acceleration travel are repeatedly performed, it is possible to achieve the optimal fuel efficiency of the electrified vehicle including the motor provided on each of the front and rear wheels.

The effects obtainable from the present disclosure are not limited to the above-described effects, and other effects that are not mentioned should be able to be clearly understood by those of ordinary skill in the art to which the present disclosure pertains from the following description.

BRIEF DESCRIPTION OF THE DRAWINGS

FIG. 6 is a table illustrating integrated fuel efficiency determined when the electrified vehicle according to one embodiment of the present disclosure performs the deceleration travel.

DETAILED DESCRIPTION OF THE DISCLOSURE

Figure 1:
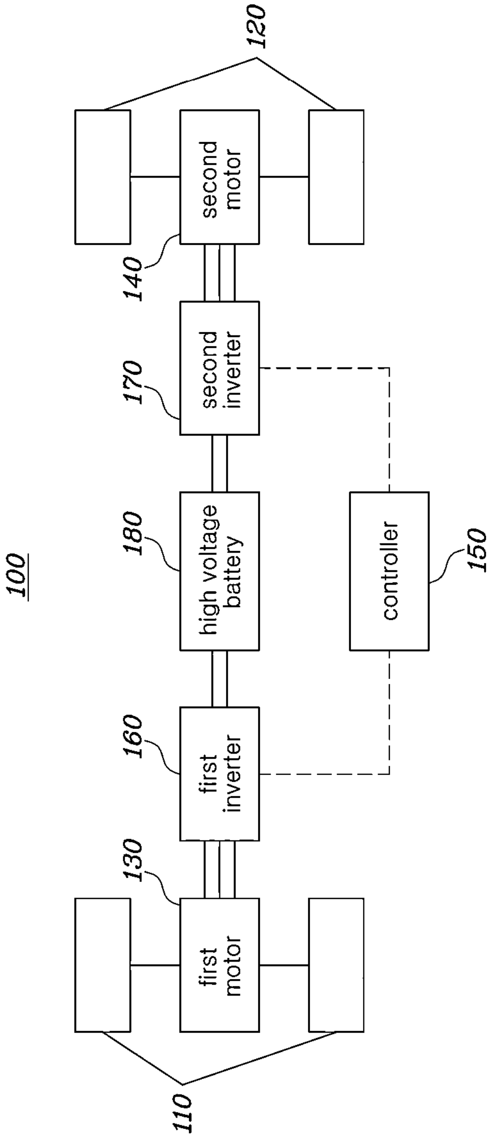
FIG. 1 is a block diagram for describing a configuration of an electrified vehicle according to one embodiment of the present disclosure.

In describing the embodiments disclosed in the specification, when it is determined that a detailed description of a related known technology may obscure the gist of the embodiments disclosed in this specification, a detailed description thereof is omitted. In addition, the accompanying drawings are only for easy understanding of the embodiments disclosed in the specification. It should be understood that the technical spirit disclosed in the specification is not limited by the accompanying drawings, and all changes, equivalents, or substitutes included in the spirit and technical scope of the present disclosure are included in the accompanying drawings.

Terms including ordinal numbers such as first or second may be used to describe various components, but the components are not limited by the terms. The terms are used only for the purpose of distinguishing one component from another.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The singular expression includes the plural expression unless the context clearly dictates otherwise. When a component, device, element, or the like of the present disclosure is described as having a purpose or performing an operation, function, or the like, the component, device, or element should be considered herein as being "configured to" meet that purpose or to perform that operation or function. Each component, device, element, and the like may separately embody or be included with a processor and a memory, such as a non-transitory computer readable media, as part of the apparatus.

In the specification, it should be understood that the terms "comprise" or "have" is intended to specify that a feature, a number, a step, an operation, a component, a part, or a combination thereof described in the specification is present. Such terms do not preclude the possibility of the presence or addition of one or more other features, numbers, steps, operations, components, parts, or combinations thereof.

Hereinafter, embodiments disclosed in this specification are described in detail with reference to the accompanying drawings. The same or similar components are denoted by the same reference numerals regardless of the drawing number and overlapping descriptions thereof have been omitted.

Hereinafter, a configuration of an electrified vehicle according to an embodiment of the present disclosure is described with reference to FIG. 1.

FIG. 1 is a block diagram for describing a configuration of an electrified vehicle according to one embodiment of the present disclosure.

Referring to FIG. 1, an electrified vehicle 100 according to an embodiment of the present disclosure may include a first drive wheel 110, a second drive wheel 120, a first motor 130, a second motor 140, a controller 150, a first inverter 160, a second inverter 170, and a high voltage battery 180. FIG. 1 mainly illustrates components related to an embodiment of the present disclosure, and the electrified vehicle may include a fewer or more components.

The electrified vehicle 100 according to an embodiment of the present disclosure which as described below, may be an electric vehicle and may be an all-wheel drive (AWD) vehicle provided with the first motor 130 and the second motor 140 to correspond to each of the drive wheels 110 and 120. Hereinafter, each component is described.

The electrified vehicle 100 may have the first drive wheel 110 and the second drive wheel 120, in which the first drive wheel 110 may be a front wheel of the vehicle, and the second drive wheel 120 may be a rear wheel of the vehicle.

In addition, the first motor 130 may be provided to correspond to the first drive wheel 110, and the second motor 140 may be provided to correspond to the second drive wheel 120. Therefore, when the electrified vehicle 100 travels, the electrified vehicle 100 may use the first motor 130 as a main driving source, may use the second motor 140 as the main driving source, and may use the first motor 130 and the second motor 140 to have a torque distribution ratio optimized for a travel situation.

The controller 150 may control the electrified vehicle 100 and in particular, control driving of the first motor 130 and the second motor 140 provided in the electrified vehicle 100. In this case, the controller 150 may control the first motor 130 and the second motor 140 through the first inverter 160 and the second inverter 170 provided in the electrified vehicle 100. For example, the controller 150 may determine driving torques or regenerative braking torques to be output by the first motor 130 and the second motor 140 according to a required driving force or a required braking force and transmit the corresponding torque command to the first inverter 160 and the second inverter 170.

In implementing the controller 150 according to an embodiment of the present disclosure, the controller 150 may be implemented as one function of a vehicle control unit (VCU) that is an upper-level controller for controlling the overall powertrain of an electric vehicle. However, this is illustrative, and the present disclosure is not necessarily limited thereto. For example, the controller 150 may be implemented as a separate controller from the upper-level controller or implemented in the form in which functions of two or more different controllers are distributed.

The first inverter 160 may be provided to correspond to the first motor 130, and the second inverter 170 may be provided to correspond to the second motor 140. The first inverter 160 and the second inverter 170 may receive a control signal from the controller 150 and allow the first motor 130 and the second motor 140 to be driven, respectively, according to the received control signal.

The high voltage battery 180 as a power source of the electrified vehicle 100 may be connected to the first motor 130 and the second motor 140 and may provide charged power to the first motor 130 and the second motor 140 or may be charged by receiving the powers from the first motor 130 and the second motor 140.

The present disclosure according to an embodiment, which is described below, is directed to providing the electrified vehicle 100 that travels while securing, i.e., attaining, achieving, obtaining, etc., optimal fuel efficiency upon traveling according to a specific control mode with respect to the electrified vehicle 100 including the motors 130 and 140 provided on the front drive wheel 110 and the second drive wheel 120, respectively. In addition, in the following description, it is assumed that the specific control mode is a mode in which a smart cruise control (SCC) function is implemented by a pulse and glide (PnG) method or control mode, but this is for convenience of description. The present disclosure is not necessarily limited thereto and may also be applied to other types of control modes such as autonomous driving control. This is described in detail with reference to FIG. 2.

Figure 2:
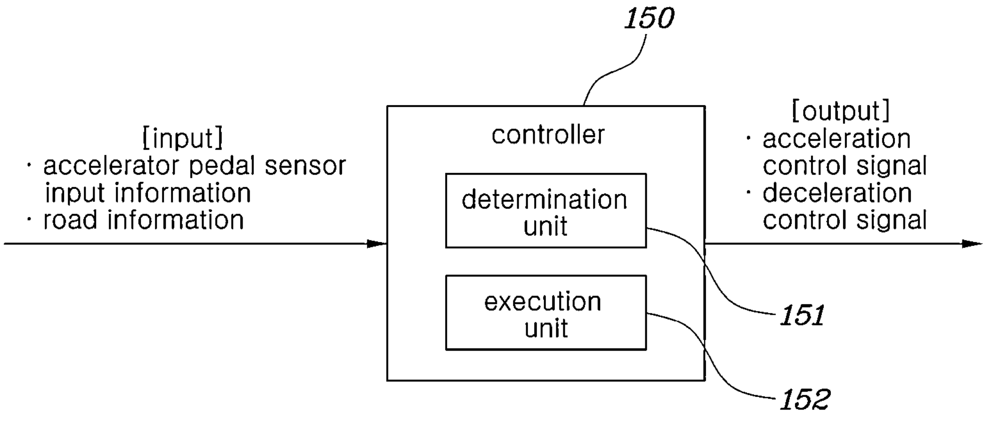
FIG. 2 is a block diagram for describing an operation of a controller according to one embodiment of the present disclosure.

FIG. 2 is a block diagram for describing an operation of a controller according to one embodiment of the present disclosure.

Referring to FIG. 2, the controller 150 according to an embodiment of the present disclosure may: determine a target control vehicle speed based on a preset target vehicle speed when the electrified vehicle 100 enters a travel control mode in which acceleration travel and deceleration travel after the acceleration travel are repeatedly performed; and control each of the first motor 130 and the second motor 140 when the electrified vehicle 100 performs the deceleration travel in consideration of the determined target control vehicle speed and integrated fuel efficiencies when the electrified vehicle 100 performs the acceleration travel and the deceleration travel.

The controller 150 according to an embodiment of the present disclosure may include a determination unit 151 and an execution unit 152. FIG. 2 mainly illustrates components related to an embodiment of the present disclosure, and the electrified vehicle may include a fewer or more components in actually implementing the controller.

Hereinafter, each component is described.

First, the determination unit 151 may determine whether the SCC function or the autonomous driving function is activated. A driver of a vehicle may activate the SCC function or the autonomous driving function through a display device or an operable physical button mounted in the vehicle. The determination unit 151 may collect information about this and determine whether the SCC function or the autonomous driving function is activated.

When the SCC function or the autonomous driving function is activated, the determination unit 151 may determine that the vehicle has entered the travel control mode in which the acceleration travel and the deceleration travel after the acceleration travel are repeatedly performed and may determine the target control vehicle speed based on the preset target vehicle speed when the vehicle enters the travel control mode.

In addition, the determination unit 151 may determine the target control vehicle speed in consideration of a preset vehicle speed upper limit value and vehicle speed lower limit value additionally with respect to the preset target vehicle speed. In this case, the preset target vehicle speed, the vehicle speed upper limit value, and the vehicle speed lower limit value may be input by the driver of the vehicle before the vehicle enters the above-described travel control mode or may be preset values according to the specification of the vehicle.

Therefore, the determination unit 151 may determine the target control vehicle speed that includes a target upper limit control vehicle speed considering the vehicle speed upper limit value with respect to the target vehicle speed and a target lower limit control vehicle speed considering the vehicle speed lower limit value with respect to the target vehicle speed.

In this case, when the electrified vehicle 100 enters the above-described travel control mode, a section in which the electrified vehicle 100 performs the acceleration travel may be a section in which the electrified vehicle 100 accelerates from the target lower limit control vehicle speed to the target upper limit control vehicle speed. Also, a section in which the electrified vehicle 100 performs the deceleration travel may be a section in which the electrified vehicle 100 decelerates from the target upper limit control vehicle speed to the target lower limit control vehicle speed. However, this is illustrative, and the present disclosure is not necessarily limited thereto.

When the target control vehicle speed is determined, the determination unit 151 may determine control factors required to control the vehicle when the electrified vehicle 100 performs the acceleration travel and the deceleration travel based on the determined target control vehicle speed. This is described with reference to FIG. 3.

Figure 3:
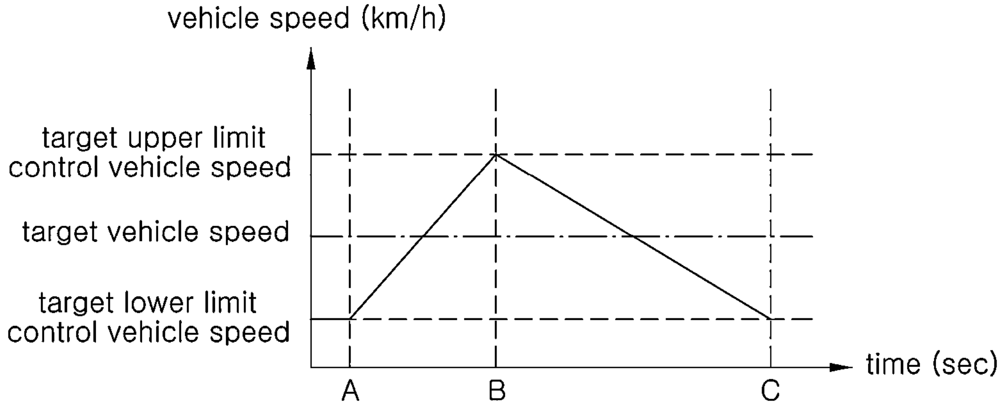
FIG. 3 is a graph for describing a change in vehicle speed over time upon travel control of the electrified vehicle according to one embodiment of the present disclosure.

FIG. 3 is a graph for describing a change in vehicle speed over time upon travel control of the electrified vehicle according to one embodiment of the present disclosure.

Referring to FIG. 3, an x-axis of the graph may indicate a time, and a y-axis of the graph may indicate a vehicle speed.

The electrified vehicle 100 may perform the travel control mode in which the acceleration travel and the deceleration travel after the acceleration travel are repeatedly performed based on the target control vehicle speed determined by the determination unit 151. In FIG. 3, only one cycle in which the electrified vehicle 100 has performed the acceleration travel and the deceleration travel after the acceleration travel is illustrated.

Referring to FIG. 3, the electrified vehicle 100 may perform the acceleration travel in which the vehicle accelerates from the target lower limit control vehicle speed to the target upper limit control vehicle speed and the deceleration travel in which the vehicle decelerates from the target upper limit control vehicle speed to the target lower limit control vehicle speed. Therefore, an acceleration travel section may be a section between a time point A and a time point B, a deceleration travel section may be a section between the time point B and a time point C, and after the time point C, the acceleration travel section may be present again.

Since the present disclosure is intended to secure optimal fuel efficiency by controlling the electrified vehicle 100 to perform the acceleration travel and the deceleration travel after the acceleration travel, it may be necessary to perform the travel control in order to secure the optimal fuel efficiency for each of the acceleration travel section (section A to section B) and the deceleration travel section (section B to section C).

Therefore, the determination unit 151 may determine the control factors required to control the vehicle when the electrified vehicle 100 performs the acceleration travel and the deceleration travel for each of the acceleration travel section and the deceleration travel section.

Referring back to FIG. 2, the determination unit 151 may determine an acceleration at which the optimal fuel efficiency of the electrified vehicle 100 can be secured when the electrified vehicle 100 performs the acceleration travel and determine a travel condition in which the optimal fuel efficiency of the electrified vehicle 100 can be secured when the electrified vehicle 100 performs the deceleration travel.

First, an operation of determining the acceleration by the determination unit 151 when the electrified vehicle 100 performs the acceleration travel is described.

When the electrified vehicle 100 performs the acceleration travel, the electrified vehicle 100 may travel using the first motor 130 mounted in the electrified vehicle 100 as a main drive wheel, travel using the second motor 140 as the main drive wheel, and travel using the first motor 130 and the second motor 140 together.

In this case, the determination unit 151 may determine the acceleration required during the acceleration travel to secure the optimal fuel efficiency when the electrified vehicle 100 performs the acceleration travel. For example, the determination unit 151 may determine the acceleration of the electrified vehicle 100 in consideration of the determined target control vehicle speed and an optimal efficiency operating point of at least one of the first motor 130 and the second motor 140. This is described with reference to FIG. 4.

Figure 4:
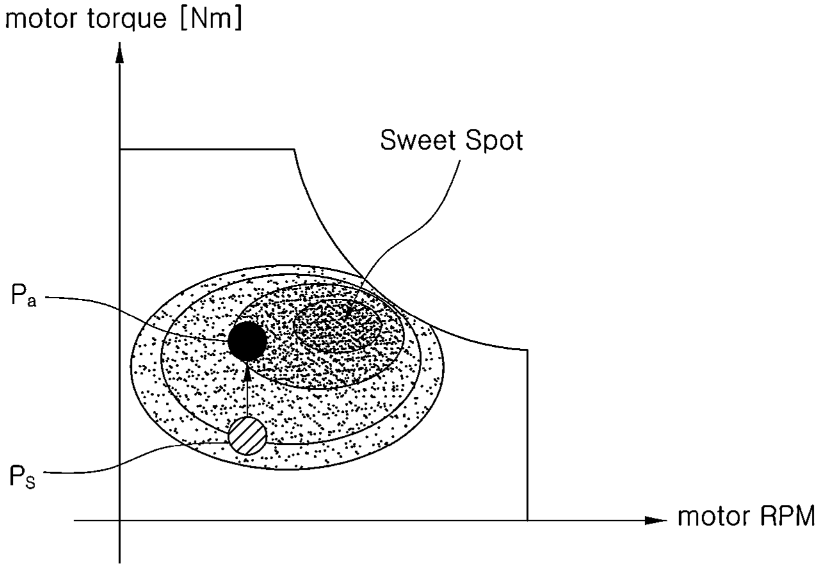
FIG. 4 is a view illustrating a driving efficiency map of a motor applied when the electrified vehicle according to one embodiment of the present disclosure performs acceleration travel.

FIG. 4 is a view illustrating a driving efficiency map of a motor applied when the electrified vehicle according to one embodiment of the present disclosure performs acceleration travel.

Referring to FIG. 4, an x-axis may indicate a motor revolutions per minute (RPM), and a y-axis may indicate a motor torque. The driving efficiency map of the motor may be pre-stored in the determination unit 151. A driving efficiency map of each of the first motor 130 and the second motor 140 according to an embodiment of the present disclosure may be pre-stored therein. However, in FIG. 4, for convenience of description, the following description is made based on the driving efficiency map of only one motor of the two motors 130 and 140.

Referring to FIG. 4, a sweet spot (e.g., an ideal operating point) may be present in the driving efficiency map. Conventional vehicles have been controlled to travel at a constant speed under a specific condition. Thus, motors mounted in the conventional vehicles could be controlled based on an operating point $P_s$ illustrated in FIG. 4. Therefore, although the conventional vehicles have traveled at the constant speed by controlling the motor based on the operating point $P_s$ positioned further away from the sweet spot, there is a problem in that the further away the vehicle is positioned from the sweet spot, the more difficult it is to secure sufficient fuel efficiency of the vehicle.

Therefore, the electrified vehicle 100 according to the present disclosure is intended to increase fuel efficiency when the motor is driven by the acceleration travel. The determination unit 151 may determine the optimal efficiency operating point close to the sweet spot. For example, a circular point $P_a$ illustrated in FIG. 4 may be an optimal efficiency operating point of the first motor 130. The determination unit 151 may determine the acceleration of the electrified vehicle 100 in consideration of the determined target control vehicle speed and the optimal efficiency operating point.

However, this is illustrative, and the present disclosure is not necessarily limited to the above-described method. For example, in the driving efficiency map of each of the first motor 130 and the second motor 140, when the first motor 130 and the second motor 140 have the same characteristics, the same driving efficiency map may be stored. However, when the first motor 130 and the second motor 140 have different characteristics, different driving efficiency maps may be stored. When the different driving efficiency maps are stored, the determination unit 151 may determine the optimal efficiency operating point of the first motor 130 based on the driving efficiency map of the first motor 130 and determine an optimal efficiency operating point of the second motor 140 based on the driving efficiency map of the second motor 140. In addition, the determination unit 151 may determine the acceleration of the electrified vehicle 100 based on each of the determined optimal efficiency operating points of the first motor 130 and the second motor 140.

Next, an operation of determining a travel condition by the determination unit 151 when the electrified vehicle 100 performs the deceleration travel is described.

When the electrified vehicle 100 performs the deceleration travel, each of the first motor 130 and the second motor 140 mounted in the electrified vehicle 100 may be controlled so that the vehicle performs regenerative braking or is operated in a coasting state in which power is cut off. Although the determination unit 151 may determine only the fuel efficiency when the electrified vehicle 100 performs the deceleration travel, when the electrified vehicle 100 is controlled to be operated in the coasting state, there is no power consumed or generated by the first motor 130 or the second motor 140. Thus, there is a problem in that it is difficult to determine fuel efficiency.

Therefore, the determination unit 151 may determine integrated fuel efficiencies when the electrified vehicle 100 performs the acceleration travel and the deceleration travel based on the target control vehicle speed determined when the electrified vehicle 100 performs the deceleration travel.

Specifically, the determination unit 151 may determine the integrated fuel efficiency of the electrified vehicle 100 in each of a plurality of cases in which each of the first motor 130 and the second motor 140 variously performs the regenerative braking or coasting control. The first motor 130 and the second motor 140 may be controlled to perform the same operation, but in some cases, may be controlled to perform different operations.

For example, there may be a first case in which both the first motor 130 and the second motor 140 are subjected to coasting control. There may be a second case in which the first motor 130 is subjected to the coasting control and the second motor 140 is subjected to the regenerative braking control. There may be a third case in which the first motor 130 is subjected to the regenerative braking control and the second motor 140 is subjected to the coasting control. There may also be a fourth case in which both the first motor 130 and the second motor 140 are subjected to the regenerative braking control. However, this is illustrative, and the present disclosure is not necessarily limited thereto.

When the first motor 130 or the second motor 140 is subjected to the coasting control, there is no force acting on the first motor 130 or the second motor 140, and thus there is nothing to consider. However, when the first motor 130 or the second motor 140 is subjected to the regenerative braking control, a regenerative braking efficiency map of the first motor 130 or the second motor 140 may be considered. This is because the first motor 130 or the second motor 140 is greatly involved in determining the fuel efficiency of the electrified vehicle 100 as the first motor 130 or the second motor 140 is subjected to the regenerative braking control.

Therefore, the determination unit 151 may determine the integrated fuel efficiency of the electrified vehicle 100 in consideration of an optimal regenerative efficiency operating point of the first motor 130 or the second motor 140 when at least one of the first motor 130 and the second motor 140 performs the regenerative braking among the above-described plurality of cases. This is described with reference to FIG. 5.

Figure 5:
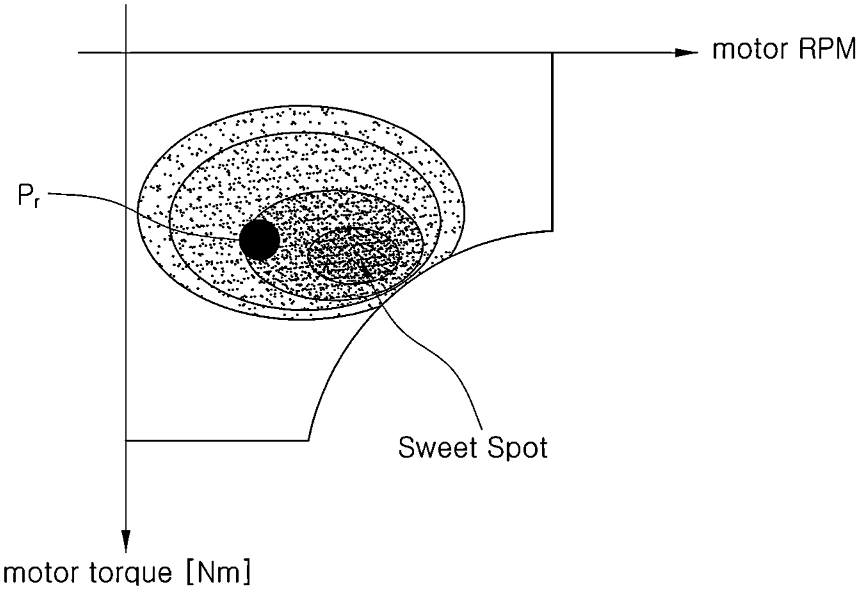
FIG. 5 is a view illustrating a regenerative braking efficiency map of the motor applied when the electrified vehicle according to one embodiment of the present disclosure performs deceleration travel.

FIG. 5 is a view illustrating a regenerative braking efficiency map of the motor applied when the electrified vehicle according to one embodiment of the present disclosure performs deceleration travel.

Referring to FIG. 5, an x-axis may indicate a motor RPM, and a y-axis may indicate a motor torque. The regenerative braking efficiency map of the motor may be pre-stored in the determination unit 151. Also, a regenerative braking efficiency map of each of the first motor 130 and the second motor 140 according to an embodiment of the present disclosure may be pre-stored therein. However, in FIG. 5, for convenience of description, the following description is made based on the regenerative braking efficiency map of only one motor of the two motors 130 and 140.

Referring to FIG. 5, a sweet spot (e.g., an ideal operating point) may be present in the regenerative braking efficiency map. In order to increase the fuel efficiency due to regenerative braking when the motor performs the regenerative braking, the determination unit 151 may determine an optimal regenerative efficiency operating point close to the sweet spot. For example, a circular point $P_r$ illustrated in FIG. 5 may be an optimal regenerative efficiency operating point of the first motor 130. In addition, the determination unit 151 may determine the integrated fuel efficiency when the electrified vehicle 100 performs the deceleration travel in consideration of the determined optimal regenerative efficiency operating point.

However, this is illustrative, and the present disclosure is not necessarily limited to the above-described method. For example, in the regenerative braking efficiency map of each of the first motor 130 and the second motor 140, when the first motor 130 and the second motor 140 have the same characteristics, the same regenerative braking efficiency map may be stored. However, when the first motor 130 and the second motor 140 have different characteristics, different regenerative braking efficiency maps may be stored. When the different regenerative braking efficiency maps are stored, the determination unit 151 may determine the optimal regenerative efficiency operating point of the first motor 130 based on the regenerative braking efficiency map of the first motor 130 and determine an optimal regenerative efficiency operating point of the second motor 140 based on the regenerative braking efficiency map of the second motor 140. In addition, the determination unit 151 may determine the integrated fuel efficiency when the electrified vehicle 100 performs the deceleration travel in consideration of all the determined optimal regenerative efficiency operating points of the first motor 130 and the second motor 140.

Referring back to FIG. 2, the determination unit 151 may determine the integrated fuel efficiency in each of the above-described plurality of cases and determine the case in which the integrated fuel efficiency is the highest among the plurality of cases after comparing the determined integrated fuel efficiencies.

In another embodiment, the determination unit 151 may determine the integrated fuel efficiency through Equation 1 below.

$$\text{Integrated fuel efficiency [km/kWh]} = \text{(travel distance upon accelaration [km]} + \text{travel distance upon deceleration [km]/} \text{(power consumption [kWh] upon accelaration} + \text{power consumption [kWh] upon deceleration)} \quad \text{[Equation 1]}$$

The determination unit 151 may determine the integrated fuel efficiency in each of the plurality of cases, and in this case, the travel distance during the acceleration travel may be determined based on the target control vehicle speed. The travel distance during the deceleration travel may also be determined based on the target control vehicle speed. However, the travel distance may be determined differently depending on whether each of the first motor 130 and the second motor 140 performs the regenerative braking or the coasting operation.

Power consumption during the acceleration travel and power consumption during the deceleration travel may be calculated through a process to be described below based on the determined target control vehicle speed.

For example, the determination unit 151 may collect road information of a road on which the electrified vehicle 100 travels and calculate power consumption in consideration of the collected road information.

Specifically, the determination unit 151 may calculate a driving force (F) based on road gradient information included in the collected road information, pre-stored travel resistance information, and a vehicle speed, and this may be calculated through Equation 2 below.

$$F = a \cdot V^2 + b \cdot V + c + \text{mgsin}\theta \quad \text{[Equation 2]}$$

In this case, a, b, and c denote pre-stored travel resistance information, and the travel resistance information may include information about acceleration resistance and information about gradient resistance. In addition, V denotes a vehicle speed, m denotes a body weight, and θ denotes a road gradient angle included in the road gradient information.

In addition, the determination unit 151 may calculate a torque ($T_e$) acting on the motor based on the calculated driving force (F). This may be calculated through Equation 3 below.

$$T_e = F \times R_{tire} \times \frac{1}{FGR} \times \frac{1}{eff} \quad \text{[Equation 3]}$$

In this case, $R_{tire}$ denotes a rolling radius of a wheel of the electrified vehicle 100, FGR denotes a gear ratio of a reducer provided on the wheel and eff denotes efficiency of the motor.

The calculated torque ($T_e$) may be a driving torque or regenerative braking torque of the motor in some cases. In addition, in the efficiency (eff) of the motor, when the optimal efficiency operating point or the optimal regenerative efficiency operating point of each of the first motor 130 and the second motor 140 is determined, efficiencies corresponding to the optimal efficiency operating point or the optimal regenerative efficiency operating point determined based on the efficiency map of each of the first motor 130 and the second motor 140 may be determined.

In addition, the determination unit 151 may calculate the RPM ($\omega_e$) of the motor based on Equation 4 below.

$$\omega_e = V \times FGR \times \frac{1}{R_{tire}} \quad \text{[Equation 4]}$$

In addition, the determination unit 151 may calculate power consumption (W) through Equation 5 below based on the torque ($T_e$) acting on the motor calculated through Equation 3 and the RPM ($\omega_e$) of the motor calculated through Equation 4.

$$W = \int_{t_s}^{t_e} T_e \times \omega_e \quad \text{[Equation 5]}$$

In this case, $t_s$ denotes a time point at which the acceleration travel or deceleration travel of the electrified vehicle 100 starts and $t_e$ denotes a time point at which the acceleration travel or deceleration travel of the electrified vehicle 100 ends.

When the torque ($T_e$) used when calculating the power consumption (W) is the regenerative braking torque of the motor, the calculated power consumption (W) may be a power charge amount during the deceleration travel. For example, when the power consumption during the acceleration travel is calculated to be a positive (+) value, the power consumption during the deceleration travel is the power charge amount and thus may be calculated to be a negative (−) value. However, this is illustrative, and the present disclosure is not necessarily limited thereto.

Through the above-described process, the determination unit 151 may determine the integrated fuel efficiency of the electrified vehicle 100 in each of the above-described plurality of cases, which may be shown as illustrated in FIG. 6.

FIG. 6 is a table illustrating integrated fuel efficiency determined when the electrified vehicle according to one embodiment of the present disclosure performs the deceleration travel.

Referring to FIG. 6, the determination unit 151 may determine the integrated fuel efficiency when the electrified vehicle 100 performs the deceleration travel in each of the plurality of cases. In addition, the determination unit 151 may determine a case in which the integrated fuel efficiency is the highest among the plurality of cases after comparing the determined integrated fuel efficiencies. For example, the determination unit 151 may determine that the first case is the case in which the integrated fuel cost is the highest.

FIG. 6 is a view for describing determining the integrated fuel efficiency in each of the plurality of cases and determining the case in which the integrated fuel efficiency is the highest after comparing the integrated fuel efficiencies by the determination unit 151 according to an embodiment of the present disclosure. However, the values illustrated in FIG. 6 are illustrative, and the present disclosure is not necessarily limited thereto.

When the determination unit 151 determines the case in which the integrated fuel efficiency is the highest, the determination unit 151 may transmit the case to the execution unit 152.

The execution unit 152 may perform the regenerative braking or coasting control on each of the first motor 130 and the second motor 140 to correspond to the case in which the integrated fuel efficiency is the highest determined by the determination unit 151. For example, the execution unit 152 may generate a deceleration control signal that allows each of the first motor 130 and the second motor 140 to perform the regenerative braking or coasting control. In addition, the execution unit 152 may transmit the generated deceleration control signal to the first inverter 160 and the second inverter 170 described with reference to FIG. 1.

The first inverter 160 and the second inverter 170 may respectively control the corresponding first motor 130 and second motor 140 to perform the regenerative braking or become the coasting state based on the received deceleration control signal.

In other words, by controlling the electrified vehicle 100 to perform the deceleration travel in the case in which the integrated fuel efficiency is the highest among the plurality of cases considering control operation situations of the two motors 130 and 140, it is possible to secure the optimal fuel efficiency of the electrified vehicle 100 when the electrified vehicle 100 performs the deceleration travel.

Hereinafter, a method of controlling the travel of the electrified vehicle 100 according to an embodiment of the present disclosure is described with reference to FIG. 7 based on the above-described configurations of FIGS. 1 and 2. Since a specific description of each operation has been made above with reference to FIGS. 2-6, the description thereof has been omitted.

In addition, hereinafter, for convenience of description, each operation may be performed collectively by the controller 150.

Figure 7:
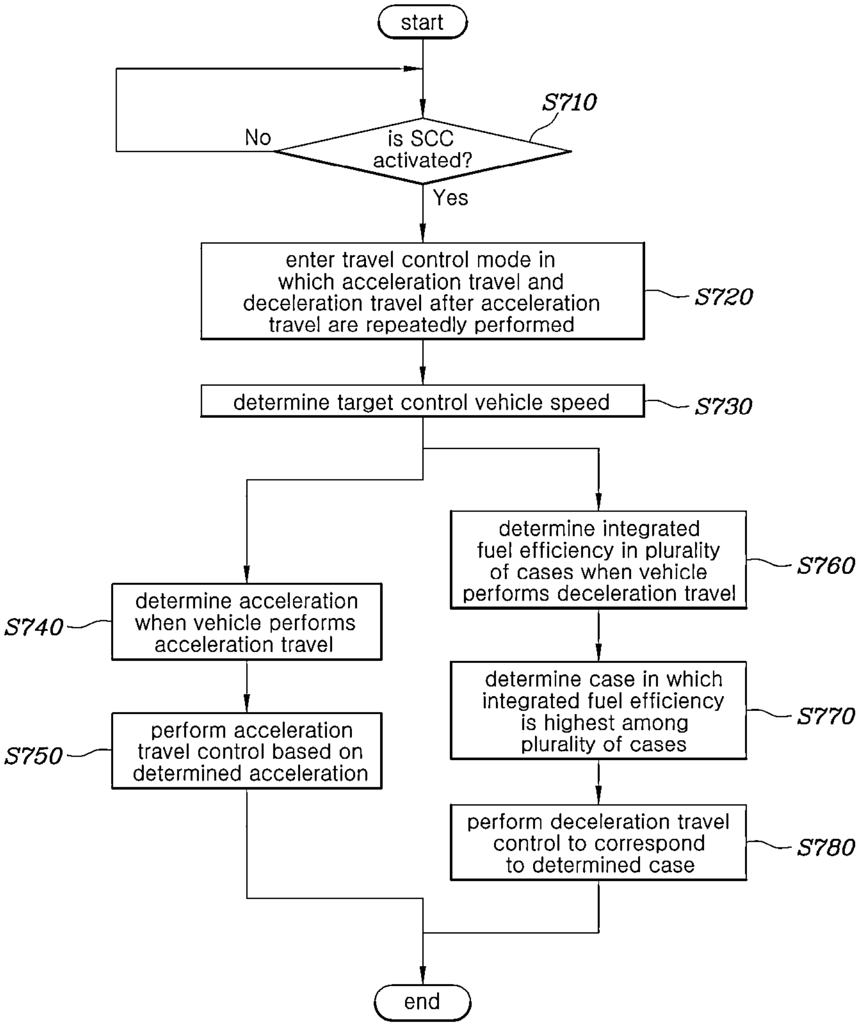
FIG. 7 is a flowchart for describing a method of controlling the travel of the electrified vehicle according to one embodiment of the present disclosure.

FIG. 7 is a flowchart for describing a method of controlling the travel of the electrified vehicle according to one embodiment of the present disclosure.

Referring to FIG. 7, the controller 150 may determine whether the SCC function is activated (S710). When the SCC function is activated (YES in S710), the controller 150 may determine that the electrified vehicle 100 has entered the travel control mode in which the acceleration travel and the deceleration travel after the acceleration travel are repeatedly performed (S720).

When the electrified vehicle 100 enters the above-described travel control mode, the controller 150 may determine the target control vehicle speed based on the preset target vehicle speed (S730). In addition, the controller 150 may perform control logic for each of the acceleration travel situation and the deceleration travel situation of the electrified vehicle 100 based on the determined target control vehicle speed.

First, when the electrified vehicle 100 performs the acceleration travel, the controller 150 may determine the acceleration of the electrified vehicle 100 in consideration of the determined target control vehicle speed and the optimal efficiency operating point of the first motor 130 or the second motor 140 (S740).

When the acceleration is determined, the controller 150 may control the electrified vehicle 100 to perform the acceleration travel based on the determined acceleration (S750).

When the electrified vehicle 100 performs the deceleration travel, the controller 150 may determine the integrated fuel efficiency of the electrified vehicle 100 in each of the plurality of cases in which each of the first motor 130 and the second motor 140 variously performs the regenerative braking or coasting control (S760). In this case, the controller 150 may consider the previously determined target control vehicle speed.

The controller 150 may determine the case in which the integrated fuel efficiency is the highest among the plurality of cases after comparing the integrated fuel efficiencies determined in each of the plurality of cases (S770). In addition, the controller 150 may perform the regenerative braking or coasting control on each of the first motor 130 and the second motor 140 to correspond to the case in which the determined integrated fuel efficiency is the highest and control the electrified vehicle 100 to perform the deceleration travel (S780).

According to the above description, in the electrified vehicle and the method of controlling the travel of the electrified vehicle according to the present disclosure, by performing the optimal control on the motor provided on each of the front and rear wheels when the vehicle performs the travel control mode in which acceleration travel and deceleration travel after the acceleration travel are repeatedly performed, it is possible to secure the optimal fuel efficiency of the electrified vehicle including the motor provided on each of the front and rear wheels.

Although specific embodiments of the present disclosure have been illustrated and described, it should be apparent to those of ordinary skill in the art that the present disclosure may be variously improved and changed without departing from the technical spirit of the present disclosure provided by the appended claims.

The above-described present disclosure may be implemented as computer-readable codes on a medium on which a program is recorded. The computer-readable recording medium includes any type of recording media in which data that may be read by a computer system are stored. Examples of the computer-readable media include a hard-disk drive (HDD), a solid-state disk (SSD), a silicon disk drive (SDD), a read only memory (ROM), a random-access memory (RAM), a compact-disk ROM (CD-ROM), a magnetic tape, a floppy disk, an optical data storage device, and the like. Therefore, the above detailed description should not be construed as limiting in all respects and should be considered illustrative. The scope of the present disclosure should be determined by reasonable construction of the appended claims, and all changes within the equivalent scope of the present disclosure are included in the scope of the present disclosure.

What is claimed is:

1. A method of controlling travel of an electrified vehicle, the method comprising:

determining a target control vehicle speed based on a preset target vehicle speed when a vehicle including a first motor corresponding to a first drive wheel and a second motor corresponding to a second drive wheel enters a travel control mode in which acceleration travel and deceleration travel after the acceleration travel are repeatedly performed;

performing regenerative braking or coasting control on each of the first motor and the second motor when the vehicle performs the deceleration travel in consideration of the determined target control vehicle speed and integrated fuel efficiencies when the vehicle performs the acceleration travel and the deceleration travel;

after determining the target control vehicle speed, determining an acceleration of the vehicle in consideration of the determined target control vehicle speed and an optimal efficiency operating point of at least one of the first motor and the second motor when the vehicle performs the acceleration travel; and performing driving control on each of the first motor and the second motor based on the determined acceleration.

2. The method according to claim 1, further comprising, before determining the target control vehicle speed, entering the travel control mode when a smart cruise control function or autonomous driving function of the vehicle is activated.

3. The method according to claim 1, wherein determining the target control vehicle speed includes determining the target control vehicle speed in consideration of a preset vehicle speed upper limit value and vehicle speed lower limit value additionally with respect to the target vehicle speed.

4. The method according to claim 3, wherein the target control vehicle speed includes a target upper limit control vehicle speed considering the vehicle speed upper limit value with respect to the target vehicle speed and a target lower limit control vehicle speed considering the vehicle speed lower limit value with respect to the target vehicle speed.

5. The method according to claim 4, wherein:

a section in which the acceleration travel is performed is a section in which the vehicle accelerates from the target lower limit control vehicle speed to the target upper limit control vehicle speed; and a section in which the deceleration travel is performed is a section in which the vehicle decelerates from the target upper limit control vehicle speed to the target lower limit control vehicle speed.

6. The method according to claim 1, wherein performing regenerative braking or coasting control includes:

determining integrated fuel efficiency of the vehicle in each of a plurality of cases in which each of the first motor and the second motor variously performs regenerative braking or coasting control; and performing the regenerative braking or coasting control on each of the first motor and the second motor to correspond to a case in which the integrated fuel efficiency is the highest in the plurality of cases.

7. The method according to claim 6, wherein determining the integrated fuel efficiency includes determining the integrated fuel efficiency of the vehicle in consideration of an optimal regenerative efficiency operating point of the first motor or the second motor when at least one of the first motor and the second motor performs the regeneration braking among the plurality of cases.

8. The method according to claim 6, wherein determining the integrated fuel efficiency includes determining the integrated fuel efficiency of the vehicle additionally in consideration of road information of a road on which the vehicle travels in each of the plurality of cases.

9. An electrified vehicle comprising:

a first motor corresponding to a first drive wheel;

a second motor corresponding to a second drive wheel; and a controller configured to:

determine a target control vehicle speed based on a preset target vehicle speed when a vehicle including the first motor and the second motor enters a travel control mode in which acceleration travel and deceleration travel after the acceleration travel are repeatedly performed;

perform regenerative braking or coasting control on each of the first motor and the second motor when the vehicle performs the deceleration travel in consideration of the determined target control vehicle speed and integrated fuel efficiencies when the vehicle performs the acceleration travel and the deceleration travel-;

determine an acceleration of the vehicle in consideration of the determined target control vehicle speed and an optimal efficiency operating point of at least one of the first motor and the second motor when the vehicle performs the acceleration travel; and perform driving control on each of the first motor and the second motor based on the determined acceleration.

10. The electrified vehicle according to claim 9, wherein the controller is configured to determine that the vehicle has entered the travel control mode when a smart cruise control function or autonomous driving function of the vehicle is activated.

11. The electrified vehicle according to claim 9, wherein the controller is configured to determine the target control vehicle speed in consideration of a preset vehicle speed upper limit value and vehicle speed lower limit value additionally with respect to the target vehicle speed.

12. The electrified vehicle according to claim 11, wherein the target control vehicle speed includes a target upper limit control vehicle speed considering the vehicle speed upper limit value with respect to the target vehicle speed and a target lower limit control vehicle speed considering the vehicle speed lower limit value with respect to the target vehicle speed.

13. The electrified vehicle according to claim 12, wherein:

a section in which the acceleration travel is performed is a section in which the vehicle accelerates from the target lower limit control vehicle speed to the target upper limit control vehicle speed; and a section in which the deceleration travel is performed is a section in which the vehicle decelerates from the target upper limit control vehicle speed to the target lower limit control vehicle speed.

14. The electrified vehicle according to claim 9, wherein the controller is configured to:

determine integrated fuel efficiency of the vehicle in each of a plurality of cases in which each of the first motor and the second motor variously performs the regenerative braking or coasting control; and perform the regenerative braking or coasting control on each of the first motor and the second motor to correspond to a case in which the integrated fuel efficiency is the highest among the plurality of cases.

15. The electrified vehicle according to claim 14, wherein the controller is configured to determine the integrated fuel efficiency of the vehicle in consideration of an optimal regenerative efficiency operating point of the first motor or the second motor when at least one of the first motor and the second motor performs the regeneration braking among the plurality of cases.

16. The electrified vehicle according to claim 14, wherein the controller is configured to determine the integrated fuel efficiency of the vehicle additionally in consideration of road information of a road on which the vehicle travels in each of the plurality of cases.

* * * * *